United States Patent [19]

Williams

[11] 3,875,920

[45] Apr. 8, 1975

[54] CONTACTLESS IGNITION SYSTEM USING HALL EFFECT MAGNETIC SENSOR

[75] Inventor: Marshall Williams, Fremont, Calif.

[73] Assignee: Manufacturing Technology Enterprises, Sunnyvale, Calif.

[22] Filed: Feb. 4, 1974

[21] Appl. No.: 439,014

[52] U.S. Cl............................................. 123/148 E
[51] Int. Cl.............................................. F02p 1/00
[58] Field of Search..................................... 123/148

[56] References Cited
UNITED STATES PATENTS 3,373,729   3/1968   Lemen............................ 123/148 E
3,518,978   7/1970   Schmiedel....................... 123/148 F Primary Examiner—Manuel A. Antonakas
Assistant Examiner—Joseph Cangelosi
Attorney, Agent, or Firm—Patrick J. Barrett

[57] ABSTRACT

An ignition system for an internal combustion engine uses a Hall effect magnetic sensor to replace the usual breaker points. The Hall effect sensor is placed in a stationary magnetic field and the magnetic field strength is periodically varied by a ferrous shunting element attached to the distributor shaft. The Hall effect sensor is, in turn, connected to circuitry which supplies a pulsating voltage signal to the ignition coil in the engine.

5 Claims, 2 Drawing Figures

CONTACTLESS IGNITION SYSTEM USING HALL EFFECT MAGNETIC SENSOR

BACKGROUND OF THE INVENTION

The field to which this invention relates is internal combustion engine ignition systems and more particularly ignition systems that use contactless means to replace the usual breaker points.

Several forms of contactless ignition systems are known in the prior art. A first type of system functions similarly to a voltage generator. One or more magnets is attached to a rotating member affixed to the distributor shaft to create a rotating magnetic field, which induces a voltage in one or more pickup coils atached to the distributor housing. As the magnetic field lines from the rotating magnet cut across the conductors in the pickup coils, a voltage is induced in these conductors proportional to the speed of the engine. This induced voltage is amplified and used to actuate a switch which turns on and off the voltage supply to the ignition coil. A principal disadvantage of this system is that the voltage from the pickup coil depends on engine speed and must be highly amplified in order to provide a useful signal at low engine speeds. The high gain necessary in such an amplifier also makes it highly susceptible to noise and therefore can be a cause of engine misfiring.

Another prior art system uses an optical sensor to detect the rotation of the distributor shaft and provide a timed signal for energizing the ignition coil. Although there are a number of ways of configuring an optical system, most suffer from the problem that dirt and contamination reduce the optical signal strength. This problem, in turn, can lead to engine misfiring.

A third type of contactless ignition system uses a rotating magnetic or star wheel having several magnets similar to the inductive system described above. Instead of using a pickup coil, other magnetically sensitive elements are used such as a magnetically variable resistor of a Hall effect sensor. A magnetically sensitive resistor changes resistance as the magnetic field surrounding it changes. This device may be used to supply voltage pulses to the ignition coil by driving a current through the resistor and using the voltage developed across it to trigger an electronic switch. A Hall effect sensor is a semiconductor device through which a current may be passed. When it is placed in a magnetic field normal to the current path, a voltage appears across the device along an axis that is normal to both the current flow and the magnetic field. This voltage may be amplified and used to drive an electronic switch which provides a pulsating voltage for the ignition coil. Such a system is described, for example, in U.S. Pat. Nos. 3,297,009 and 3,373,729. A principal disadvantage of both of these devices is that a wheel carrying magnets on the distributor shaft is a comparatively complicated and costly item to manufacture and requires significant modifications to distributors currently used in automobiles using a contacting breaker system. Thus, the replacement of the common type of distributor having a contacting breaker with one of the foregoing systems usually requires the replacement of the entire distributor rather than a few selective components within the distributor.

SUMMARY OF THE INVENTION

According to the preferred embodiment of the present invention a contactless ignition system can be constructed using a Hall effect sensor that is placed in a stationary magnetic field. The magnetic field is varied in response to the rotation of the distributor shaft by attaching a ferrous shunt wheel to the shaft. The shunt wheel has a number of ferrous vanes that pass by the Hall effect sensor to shunt the stationary magnetic field. When the magnetic field is shunted, the field through the Hall effect sensor is decreased and the voltage developed across the Hall effect sensor therefore decreases. This decrease in voltage is amplified and used to open and close a switch for creating periodic voltage impulses in the ignition coil. The shunt wheel is simple and inexpensive to make, and can be easily attached to the distributor shaft of distributors currently in use. Likewise, the Hall effect sensor, with its stationary magnet, can be attached to the breaker plate in place of the points and capacitor currently used in contact type ignition systems. The cost saving realized by this system is due, in part, to the fact that the ferrous shunt wheel may be fabricated out of a piece of steel using known and readily available technology much more easily than permanently magnetized materials can be formed into shapes convenient for use in automotive distributors. In addition the material costs for a ferrous shunt wheel are considerably less than for a magnetic star wheel.

Another saving realized through the use of this invention is the ability to use smaller magnets than those used by prior art devices. By placing the Hall effect sensor between the poles of a "C"-shaped magnet or pole pieces connected to another shape magnet, the air gap between the magnet and the sensor is minimized. With a smaller air gap, the size of the magnet necessary for a given field strength is decreased, allowing the use of smaller and less expensive magnets. This reduction in the size of the magnet allows the entire system to be made more compact.

DESCRIPTION OF THE PREFERRED EMBODIMENT

Figure 1:
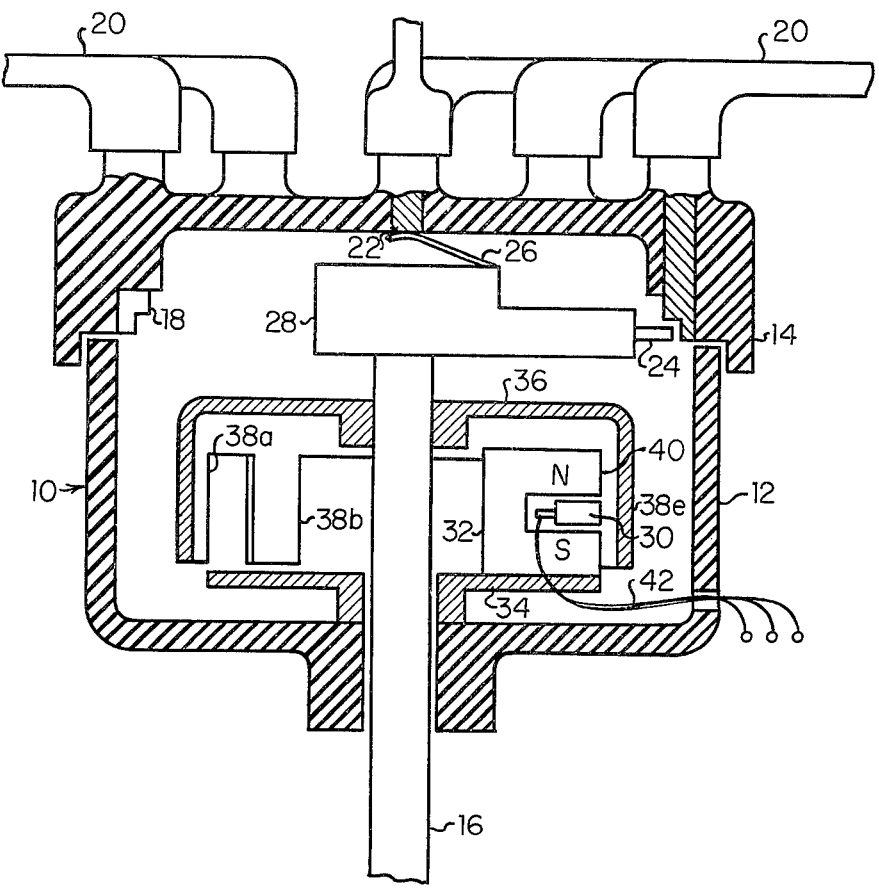
FIG. 1 shows a cutaway view of a distributor embodying the preferred embodiment of the present invention.

FIG. 1 shows a cutaway view of a typical distributor 10 such as is found in an automobile. The distributor typically comprises a body 12 with an insulative cap 14 and a shaft 16 which passes through the wall of body 12 to drive the internal components. Shaft 16 is connected to the crankshaft of the engine (not shown), usually by a gearing arrangement. In a four cycle engine the distributor is driven at half the crankshaft speed. Distributor cap 14 contains a number of peripheral contacts 18 which are connected to wires 20 for carrying high voltage impulses to the spark-plugs (not shown) in the engine for igniting the fuel mixture. A central contact 22 delivers a pulsating high voltage signal having the proper timing relationship to the distributor from an ignition coil. This signal is distributed to the various contacts 18 by a rotating contact 24 connected to the distributor shaft 16 and making contact with center contact 22 by a spring contact 26. Contacts 24 and 26 are carried by distributor rotor 28.

A Hall effect sensor 30 is mounted between the poles of a "C"-shaped permanent magnet 32 which creates a stationary magnetic field. This magnetic field may also be created by other magnetic means, for example, a bar magnet with pole pieces between the magnet and the Hall effect sensor. The magnet and Hall effect are fastened to a breaker plate 34 in the distributor housing. The breaker plate may be rotated with respect to distributor housing 12 by, for example, a vacuum advance mechanism (not shown) as is commonly found in an automotive distributor. Because the Hall effect sensor 30 is situated between the north and south poles of magnet 32, the Hall effect sensor is in a high magnetic field which, as is explained below, causes it to produce a detectable output signal. A ferrous rotating shunt wheel 36 is attached to distributor shaft 16 and has a plurality of vanes including vanes 38a, 38b and 38e. In common automotive applications, the number of vanes will equal the number of cylinders in the internal combustion engine. The shunt wheel 36 may be an essentially cup-shaped piece with slots cut in its peripheral wall to form the vanes, which are usually evenly spaced about the periphery. Shunt wheel 36 is made of a material which provides a good magnetic path, ideally an iron compound. When a vane such as vane 38e is directly across face 40 of the permanent magnet, magnetic field lines from the north and south poles of the magnet will extend between the magnet and the vane, shunting the field from the Hall effect sensor 30. This shunting will reduce the magnetic field in the sensor and thereby reduce its output signal. The Hall effect sensor is connected to external circuitry through wires 42 as described below.

It should be recognized that magnet 32 along with Hall effect sensor 30 could be placed outside the circumference of shunt wheel 36. The embodiment illustrated in FIG. 1 is advantageous, however, since this configuration allows the replacement of a standard contact type breaker and breaker cam with this invention, without necessitating the replacement of the entire distributor.

Figure 2:
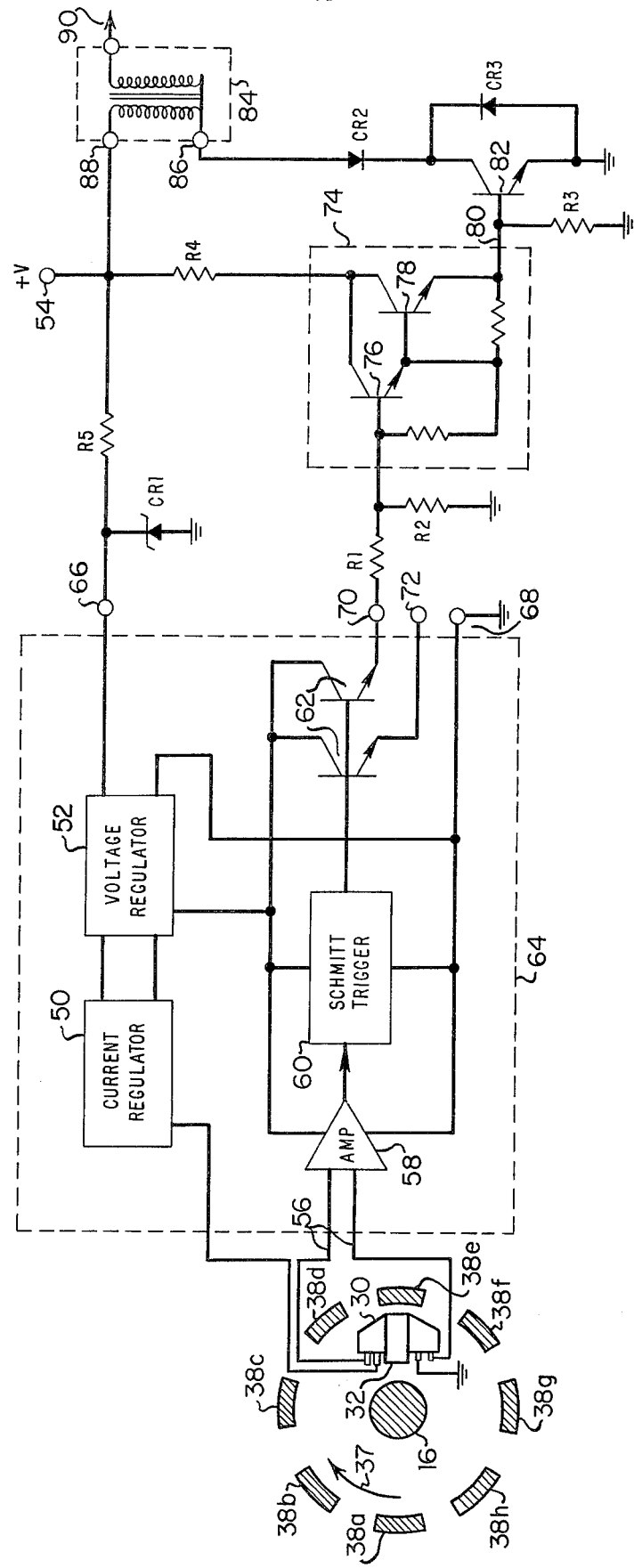
FIG. 2 shows a schematic diagram of the preferred embodiment of the present invention.

FIG. 2 shows a schematic diagram of the Hall effect sensor and the shunt wheel along with the circuitry connected to the Hall effect sensor for providing a pulsating signal to an ignition coil. A Hall effect sensor is a semiconductor device through which a current may be passed. If the sensor is placed in a magnetic field normal to the direction of this current flow, a voltage will be developed across the Hall effect sensor along an axis normal to both magnetic field and the current flow. This operation is further described in great detail in the literature, for example, in the publication *Hall Effect Manual* by Helipot Division of Beckman Inc. 1963. The voltage developed across the Hall effect sensor is measure of the field strength of the magnetic field that the sensor is in, making the Hall effect sensor a very good magnetic transducer.

Since the output of the Hall effect sensor also depends upon the magnitude of the drive current, a Hall effect sensor is usually driven with a regulated current. Thus, as shown in FIG. 2, a current regulator 50 is connected to Hall effect sensor 30 to provide drive current. The current regulator in turn, is connected to a voltage regulator 52 used to supply regulated voltage to other portions of the circuitry. Rough voltage regulation is provided by a Zener diode CR1 which is connected to voltage regulator 52 at terminal 66. The Zener diode is connected to a battery in the vehicle at terminal 54 through a resistor R5. The output signal from the Hall effect sensor is applied to wires 56 connected to the input of an amplifier 58. Usually the signal from a Hall effect sensor is on the order of a few millivolts and must be amplified up to a more useable level. The output amplifier 58 is connected to a Schmitt trigger 60 which provides a pulse output of a fixed signal level, usually on the order of about 5 volts, when the output level of the Hall effect sensor rises above a certain predetermined level. When the signal from the Hall effect sensor passes below another predetermined level the output from the Schmitt trigger falls back to a low level, usually about 0 volts. The Schmitt trigger 60 thus serves to shape the output pulse from amplifier 58. Because of hysteresis effects in the Schmitt trigger, the output pulse will not 90 to its low state until the voltage from the sensor passes below the level at which it caused the output of the Schmitt trigger to go to its high level. This factor helps prevent misfiring of the engine due to noise and other spurious effects.

The output of Schmitt trigger 60 is connected to transistors 62 which provide output buffering and supply or source a current signal to output circuitry in response to the signal from the Schmitt trigger. Circuit elements 50, 52, 58, 60 and 62 may be easily integrated on a single semiconductor chip along with the Hall sensor as indicated by box 64 and may be placed in one sealed package inside the distributor, minimizing the space required by electronic components. Thus in practice one would likely put not only the Hall sensor itself but all of the items in box 64 within the package between the poles of magnet 32. The integrated circuit has a voltage input 66, a ground connection 68, and two signal outputs 70 and 72. One of the signal outputs may be used as an auxiliary connection for a tachometer, for example, and the other output 70 is used to drive switching circuitry connected to the ignition coil. Such an integrated circuit Hall effect sensor is manufactured, for example, by the Microswitch Co. and is designated as its product series 5SS.

Output 70 is connected to an amplifier circuit 74 comprising a Darlington connected pair of transistors 76 and 78. Resistor R1 helps provide a load for output 70 and provides some noise immunity at the input of amplifier circuit 74. A resistor R2, connected to the base of transistor 76 and ground, is a base drive current-limiting resistor. Amplifier circuit 74 is commonly available as an integrated circuit. The output 80 of amplifier circuit 74 is connected to the base of a switching transistor 82 that is used to switch the voltage to an ignition coil 84. The collector of transistor 82 is connected to the ignition coil through a diode CR2 and emitter of this transistor is connected to ground. Another diode CR3 is connected across the collector and emitter of switching transistor 82 so that it is normally back-biased. Diodes CR2 and CR3 protect the transistor from damage due to negative transients. A resistor R3 is connected between output 80 and ground and serves as a desensitizing resistor across the base emitter junction of this transistor as well as providing a dc pass to ground for amplifier circuit 74. Voltage is supplied to transistors 76 and 78 from terminal 54 via resistor R4. The ignition coil 84 has two inputs 86 and 88, one of which is connected to the switching transistor 82 and the other to the battery at terminal 54. Ignition coil output 90 is connected to the center contact 22 in the distributor shown in FIG. 1.

The circuitry shown in FIG. 2 functions as follows: Starting when vane 38e is across the face of magnet 32 and shunts the magnetic field, the output of the Hall effect sensor drops, causing output 70 to give a low output current. This shuts off transistors 76, 78, and 82 so that there is a high voltage on the collector of 82 and essentially no current flowing through the ignition coil 84. When the shunt wheel continues to rotate in a direction indicated by arrow 37, and vane 38e is no longer shunting the magnetic field, a larger portion of the field will pass through the Hall effect sensor causing it to give a higher output, with a resultant high current signal at output 70. This high current signal will turn on transistors 76, 78 and 82. Transistors 82 will go into saturation, making the collector voltage essentially at ground level and placing a large signal across ignition coil 84. When the next vane 38d shunts the magnetic field across the Hall sensor, the output current from output 70 will again drop causing transistor 82 to turn off. When this transistor turns off, the voltage will be removed across the input terminals 86 and 88 of the ignition coil and the field in the ignition coil will start to collapse. This collapsing field will cause a high voltage signal to appear at output 90 and be applied to one of the spark-plugs to ignite the fuel mixture in a cylinder of the internal combustion engine.

The dwell angle, which is normally the amount of rotation of the distributor shaft during which the breaker points are closed, is determined in this ignition system by the spacing between the vanes of shunt wheel 36. The width of the shunt wheel may also be used to determine the dwell angle by inverting the signal from output 70 to reverse the relationship of the Hall effect sensor output voltage and the on and off condition of transistor 82.

The following is a part list showing typical values of the parts illustrated in the schematic diagram of FIG. 2:

| SYMBOL | PART DESCRIPTION |
| --- | --- |
| 74 | Motorola MJE 800 |
| 82 | Motorola MJ 9000 |
| CR1 | 1N5246 |
| CR2 | 600 Volt peak inverse voltage, 10 ampere diode, e.g., Motorola MR 1126 |
| CR3 | 600 Volt peak inverse voltage, 1 ampere diode, e.g., Motorola 1N4005 |
| R1 | 1000 ohms, ½W |
| R2 | 1000 ohms, ½W |
| R3 | 47 ohms, ½W |
| R4 | 10 ohms, 20 W |
| R5 | 33 ohms, ½W |

It has been noted above that the standard vacuum advance mechanism found in contact type distributors may be used with this invention by placing the Hall effect sensor on the breaker plate. Centrifugal advance type mechanisms may also be used by attaching shunt wheel 36 to the centrifugal advance mechansim on the distributor shaft so that the position of the vanes is varied with respect to the shaft as a function of shaft rotational speed.

It should also be noted that the shunt wheel could be constructed by fastening pieces of ferrous material in a wheel of another kind of material, conductive or nonconductive, in various forms and shapes. As described above, the essential function of the shunt wheel is to shunt the magnetic field created by stationary magnet 32 to change the Hall effect sensor output, and thus the precise form of the wheel may be chosen to suit the arrangement of the distributor it is to be used in.

I claim

1. A contactless ignition system for use in an internal combustion engine having igniting devices, the contactless ignition system comprising:

a distributor having a body and a rotable shaft in the body, adapted to distribute electrical impulses to igniting devices;

stationary magnetic means including a stationary magnet mounted in the body for producing a magnetic field in a selected region;

shunt means including a vane for shunting the magnetic field from the selected region, connected to the rotatable shaft in the body for periodically varying the magnetic field in the selected region in response to rotation of the rotatable shaft;

a Hall effect sensor mounted in the body in the selected region on the same side of the vane as the stationary magnetic means for producing a signal in response to the variations in the magnetic field in the selected region caused by the shunting of the magnetic field by the vane; and circuit means connected to the Hall effect sensor and the distributor for supplying electrical impulses to the distributor in response to the signal from the Hall effect sensor.

2. A contactless ignition system as in claim 1 wherein the shunt means is cup-shaped piece of ferrous material and the side wall of the cup comprises a plurality of vanes.

3. A contactless ignition system as in claim 1 wherein the stationary magnetic means includes a permanent magnet affixed by means to the Hall effect sensor.

4. A contactless ignition system as in claim 3 wherein the permanent magnet is "C"-shaped and the Hall sensor is located within the "C".

5. A contactless ignition system as in claim 3 wherein the means affixing the permanent magnet to the Hall effect sensor includes magnetic pole pieces.

* * * * *